United States Patent [19]

Mourot et al.

[11] Patent Number: 5,559,723
[45] Date of Patent: Sep. 24, 1996

[54] LEARNING SEQUENCE FOR ESTIMATING A TRANSMISSION CHANNEL AND CORRESPONDING ESTIMATOR DEVICE

[75] Inventors: Christophe Mourot, Asnieres; Armelle Wautier; Jean-Claude Dany, both of Gif sur Yvette, all of France

[73] Assignee: Alcatel N.V., Amsterdam, Netherlands

[21] Appl. No.: 153,097

[22] Filed: Nov. 17, 1993

[30] Foreign Application Priority Data

Nov. 18, 1992 [FR] France .................................. 92 13847

[51] Int. Cl.$^6$ ............................................. G01S 17/08
[52] U.S. Cl. ......................... 364/517; 375/229; 375/232; 375/350
[58] Field of Search ............................ 364/517; 375/14, 375/11, 103

[56] References Cited

U.S. PATENT DOCUMENTS 4,089,061  5/1978  Milewski .......................... 364/724 OR
4,152,649  5/1979  Choquet ............................. 325/42 OR

FOREIGN PATENT DOCUMENTS 2337465  7/1977  France .

*Primary Examiner*—Ellis B. Ramirez
*Assistant Examiner*—Kamini Shah
*Attorney, Agent, or Firm*—Sughrue, Mion, Zinn, Macpeak & Seas

[57]  ABSTRACT

The present invention concerns a learning sequence for estimating a transmission channel and an estimator device adapted to use a sequence of this kind. The learning sequence for estimating a transmission channel of length L comprises a guard sequence of length L followed by a reference sequence of length N such that its total length N+L is greater than or equal to 2L+1 and such that the transmission matrix A associated with it defined by the product of the Hermitian transpose $A^H$ of the transmission matrix by the transmission matrix A is inversible.

9 Claims, 1 Drawing Sheet

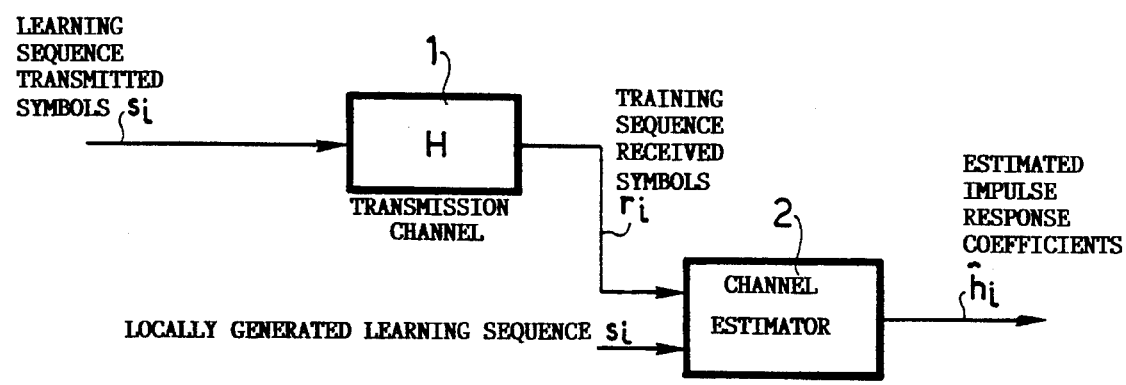

LEARNING SEQUENCE FOR ESTIMATING A TRANSMISSION CHANNEL AND CORRESPONDING ESTIMATOR DEVICE

BACKGROUND OF THE INVENTION

The present invention concerns a a learning sequence for estimating a transmission channel. It also concerns a sequence of symbols comprising data symbols and a a learning sequence of this kind and a device for estimating a transmission channel adapted to operate with a learning sequence of this kind.

In a transmission system, especially a radio transmission system, a transmitter transmits a sequence of symbols to a receiver in a transmission channel. The sequence transmitted is degraded by the transmission channel with the result that the sequence of symbols received by the receiver is no longer identical to the transmitted sequence. The main deterioration is intersymbol interference caused by the fact that a transmitted symbol can take more than one path in the transmission channel. If the distance between two paths at least is greater than the distance between two symbols transmitted in succession, a symbol taking one of these paths can interfere with a subsequent symbol taking another, shorter path.

An equalizer is used in the receiver to correct intersymbol interference. To operate correctly it must know the impulse response of the transmission channel. To this end, special symbols are transmitted in a learning sequence. These symbols are known to the receiver, unlike the data symbols which are transmitted and which it may be assumed are unknown to the receiver. It is therefore routine practice for a packet of symbols addressed to a particular receiver to comprise in succession, data symbols, a learning sequence and further data symbols, so that the learning sequence is at the centre of the packet.

The learning sequence is chosen to suit the specifications of the transmission channel and in particular its length.

Given that the symbols are transmitted regularly and therefore have a period, known as the symbol period the length of the channel is defined as the number of symbol periods equivalent to the difference between the longest path and the shortest path of the channel.

To establish the impulse response of the channel, a channel estimator device is used in the receiver to generate a replica of the learning sequence and to correlate it with the respective sequence of symbols received. The result of the correlation is a set of coefficients $h_i$ where $i$ varies from 0 to L, L being the length of the channel, the set of coefficients being addressed to the equalizer. The most direct path of the channel is represented by $h_0$, and the other coefficients represent longer paths causing interference with the the most direct path.

In the most general case these coefficients are complex because the symbols received have two orthogonal components, a "phase" component and a "quadrature" component. By convention this set of coefficients is called the impulse response.

The learning sequence always comprises a first guard sequence followed by a reference sequence followed by a second guard sequence. The first guard sequence is formed with the last L symbols of the reference sequence while the second guard sequence is formed with the first L symbols of the reference sequence. Because of the uncertainty as to the exact position of the learning sequence in the succession of symbols received, the correlation which applies only to the reference sequence is effected on a received symbol sequence of the same length but whose origin is displaced until the reference sequence generated locally is coincident with the corresponding received symbol sequence; the guard sequences are thus disposed to prevent correlation between the local reference sequence and received data symbols. For further information on the learning sequences used, which all have the same structure, reference may be had to the following documents, for example:

Giovanna d'ARIA, Valério ZINGARELLI: "Design and performance of synchronization techniques and Viterbi adaptative equalizers for narrowband TDMA mobile radio", Proceedings DMR III, Copenhagen, 13–15 September 1988;

Dirk POPPEN: "Design of training sequence for channel impulse response measurement", COST 231, Vienna, Austria, pp 2–10, January 1992;

GSM recommendations (series 05) defining the paneuropean digital cellular mobile radio network.

It seems that to use such learning sequences it is necessary to reserve 2L symbols to form the two guard sequences. Thus these symbols cannot be used to transmit data, which reduces the quantity of data that can be transmitted in a packet.

SUMMARY OF THE INVENTION

An object of the present invention is to provide a learning sequence which augments the efficiency of the transmission system, namely the quantity of data conveyed in a packet.

This object is achieved by choosing a learning sequence, for estimating a transmission channel of length L, comprising a guard sequence of length L followed by a reference sequence of length N such that its total length N+L is greater than or equal to 2L+1 and such that the transmission matrix A associated with it is such that the product of the Hermitian transpose $A^H$ of the transmission matrix by the transmission matrix A is inversible.

By using a reference sequence of this kind, it is not necessary to provide a second guard sequence in order to estimate the transmission channel, which will become clear later. The corresponding symbols can therefore be used to transmit data.

In a first embodiment of the learning sequence the product of the Hermitian transpose $A^H$ of the transmission matrix by the transmission matrix A is a multiple of the identity matrix.

In this case the operations needed to estimate the transmission channel are particularly simple.

Furthermore, the reference sequence in the learning sequence is a constant amplitude zero auto-correlation (CAZAC) sequence.

This CAZAC sequence is a polyphase sequence.

In a second embodiment of the learning sequence said reference sequence is a constant Amplitude zero auto-correlation sequence near the correlation peak (pseudo-CAZAC sequence).

Logically, the invention also concerns a sequence of symbols comprising data symbols and a learning sequence as defined hereinabove.

The invention further consists in a device for estimating a transmission channel of length L receiving at one end of said channel a training sequence corresponding to a learning sequence produced at the other end of the channel characterized in that, said learning sequence comprising a guard sequence of length L followed by a reference sequence of length N such that its total length N+L is greater than or equal to 2L+1 and such that the associated transmission matrix A is such that the resulting matrix which is the product of the Hermitian transpose $A^H$ of the transmission matrix by the transmission matrix A is inversible, a receive vector being defined as the part of said training sequence corresponding to said reference sequence, said device comprising estimator means to establish said estimate by calculating the product of the inverse of said resultant matrix $(A^H A)^{-1}$ by the Hermitian transpose of said transmission matrix $A^H$ and by said receive vector R.

The estimator device is naturally such that the estimator means are adapted to process a learning sequence so that:

the resulting matrix is a multiple of the identity matrix, or the reference sequence is a CAZAC sequence, for example a polyphase sequence, or the reference sequence is a pseudo-CAZAC sequence.

The invention will emerge more clearly from embodiments described by way of example with reference to the single figure which shows the estimator device applied to a transmission channel.

BRIEF DESCRIPTION OF THE DRAWING

The drawing figure is a functional block diagram of the invention.

DESCRIPTION OF A PREFERRED EMBODIMENT

As shown in the figure the transmission channel 1, which has an impulse response H, receives the transmitted symbols $s_i$, forming the learning sequence, and outputs received symbols $r_i$ forming the training sequence.

The estimator device 2 of the transmission channel also receives the learning sequence $s_i$, generated locally, and the training sequence $r_i$ and produces an estimate $\hat{H}$ of the impulse response of the transmission channel 1. If L is the length of the channel and P is the length of the learning sequence, the estimator device 2 must produce an estimate $\hat{H}$ of the impulse response represented by the coefficients $\hat{h}_i$ where $i$ varies between 0 and L from the transmitted symbols $s_i$ with $i$ varying from 1 to P and the received symbols $r_i$ with $i$ varying from L+1 to P, using the least squares criterion. The object is thus to minimize the mean square error J:

$$J = \sum_{i=L+1}^{P} |e_i|^2 \quad \text{where } e_i = r_i - \sum_{k=0}^{L} \hat{h}_k s_{i-k}$$

Using the following notation:

$$\hat{H} = \begin{pmatrix} \hat{h}_0 \\ \hat{h}_1 \\ \cdot \\ \cdot \\ \cdot \\ \hat{h}_L \end{pmatrix}, R = \begin{pmatrix} r_{L+1} \\ r_{L+2} \\ \cdot \\ \cdot \\ \cdot \\ r_P \end{pmatrix}, E = \begin{pmatrix} e_{L+1} \\ e_{L+2} \\ \cdot \\ \cdot \\ \cdot \\ e_P \end{pmatrix}$$

If $.^H$ represents the Hermitian transposition operator and $.^*$ represents the conjugation operator:

$$\hat{H}^H = (\hat{h}_0^* \; \hat{h}_1^* \ldots \hat{h}_L^*)$$

$$R^H = (r_{L+1}^* \; r_{L+2}^* \ldots r_P^*)$$

$$E^H = (e_{L+1}^* \; e_{L+2}^* \ldots e_P^*)$$

Introducing the transmission matrix A and its Hermitian transpose $A^H$ $$A^H = \begin{pmatrix} s_{L+1}^* & s_{L+2}^* & \cdots & s_P^* \\ s_L^* & s_{L+1}^* & \cdots & s_{P-1}^* \\ \cdot & \cdot & & \cdot \\ \cdot & \cdot & & \cdot \\ \cdot & \cdot & & \cdot \\ s_1^* & s_2^* & \cdots & s_{P-L}^* \end{pmatrix}$$

we can write:

$$E = R - A\hat{H}$$

$$J = E^H E$$

The solution is given by the set of coefficients $\hat{h}_i$ which cancels the drift of the mean square error J relative to the estimated impulse response $\hat{H}$:

$$\frac{\partial J}{\partial \hat{H}} = -2A^H R + 2A^H A \hat{H}$$

$$(A^H A)\hat{H} = A^H R$$

R is the receive vector comprising the received symbols corresponding to those of the learning sequence transmitted in transmission channel A.

The Hermitian transpose $A^H$ of the transmission matrix is fully defined by the symbols $s_i$ of the learning sequence. It comprises N columns (N=P−L) and L+1 rows. The above equation has a single solution for the estimated impulse response $\hat{H}$ if the number of columns N in the Hermitian transpose $A^H$ of the transmission matrix is greater than or equal to the number of rows:

$$N \geq L+1$$

$$P \geq 2L+1$$

It follows that the learning sequence must include at least 2L+1 coefficients.

To have access to the coefficients $\hat{h}_i$ the matrix $A^H A$ must be inversible.

In this case the coefficients $\hat{h}_i$ are obtained from the following equation:

$$\hat{H} = (A^H A)^{-1} A^H R$$

The estimator device 2 is adapted to carry out this calculation.

The learning sequence $S_i$ determines the above equation entirely. The only problem is to identify correctly the receive vector to overcome a time shift, i.e. to associate the elements $r_i$ with the respective elements $s_i$.

Assuming that there is no disturbance in the transmission channel, if the coefficients $h_k$ represent the actual impulse response to be estimated, by definition:

$$r_i = \sum_{k=0}^{L} h_k s_{i-k}$$

The problem is to avoid errors in respect of the subscript $i$, which amounts to shifting the learning sequence. To this end the latter may be quasi-periodic, i.e. there may be a number T such that for at least one $i$:

$$r_i = r_{i+T}$$

It is then a simple matter to identify two components of the vector R spaced by T and having the same value.

Given the above definition of $r_i$, it is clear that the latter is entirely determined by L symbols $s_j$ of the learning sequence with j varying from i–L to i.

Thus the minimal condition for quasi-periodicity is satisfied if the first L symbols and the last L symbols of the learning sequence are identical, which renders $r_{L+1}$ and $r_p$ equal This equality of $r_{L+1}$ and $r_p$ is easy to detect and thereafter the channel can be estimated unambiguously.

The learning sequence must therefore be in the form of a guard sequence followed by a reference sequence of length N, the guard sequence corresponding to the last L symbols of the reference sequence. It is not necessary to provide a guard sequence after the reference sequence if the channel estimate is done as described.

The condition that the matrix $A^H A$ be inversible which is necessary to implement the invention is satisfied if the reference sequence is a CAZAC (Constant Amplitude Zero AutoCorrelation) sequence. Sequences of this type are described in the article by A. MILEWSKI: "Periodic sequences with optimal properties for channel estimation and fast start-up equalization", IBM Journal of research & development, vol. 27, N° 5, September 83, pages 426–431.

CAZAC sequences include a category of sequences that are particularly beneficial in the context of this invention. These are the polyphase sequences. Such sequences comprise the nth roots of the unit, i.e. the symbols are in the form $\exp[j(\theta + 2k\pi/n)]$ where k assumes any value between 0 and n–1 and $\theta$ is any angle. See for example:

L. H. Zetterberg "A class of codes for polyphases signals on a band-limited gaussian channel", IEEE Trans. on Info. Theory, IT-11, pp 385, 1965;

A. J. Viterbi "On a class of polyphases codes for the coherent gaussian channel", IEEE Int. Cony. Record, Part 7, pp 209, 1965.

This inversibility condition is also satisfied if the reference sequence is a pseudo-CAZAC sequence, i.e. if it behaves like a CAZAC sequence near the correlation peak. Pseudo-CAZAC sequences include sequences used in the GSM European digital cellular mobile radio system.

If the reference sequence, is a CAZAC sequence the resulting matrix $A^H A$, which is the product of the Hermitian transpose of the transmission matrix by the transmission matrix, reduces to a multiple of the identity matrix. As demonstration of this property is not necessary to use of the invention, it will not be described in more detail. However, this property has the advantage that it considerably simplifies the estimator device 2.

If the reference sequence, is not a CAZAC sequence calculating the product of the inverse of the resultant matrix by the Hermitian transpose $A^H$ of the transmission matrix is performed once only, and the result is stored in a memory of the estimator device 2. In this case estimation of the channel is more complex in terms of the number of operations to be carried out than in the previous case because the number of non-null elements of the product matrix previously calculated is greater.

Simulations have been carried out and have shown that the estimator device of the invention used with a learning sequence formed by a guard sequence and a reference sequence offers the same performance as known estimator devices used with a learning sequence as above followed by a guard sequence. Thus the invention enables the number of data symbols in a packet to be increased by an amount equivalent to the length L of the channel.

What is claimed is:

1. A learning sequence of symbols for estimating a transmission characteristic of a transmission channel of length L on which said sequence is transmitted, said sequence comprising:

a guard sequence of length L, and a reference sequence of length N following said guard sequence;

wherein the learning sequence is selected to have a total length N+L greater than or equal to 2L+1;

wherein the learning sequence is selected so that a transmission matrix A, associated with the learning sequence, is such that the product of the Hermitian transpose $A^H$ of the transmission matrix by the transmission matrix A is inversible; and wherein the length L is defined as the number of symbol periods equivalent to the difference between the longest and shortest transmission paths of the channel.

2. Learning sequence according to claim 1 characterized in that the product of the Hermitian transpose $A^H$ of the transmission matrix by the transmission matrix A is a multiple of the identity matrix.

3. Learning sequence according to claim 2 characterized in that said reference sequence is a constant amplitude zero auto-correlation (CAZAC) sequence.

4. Learning sequence according to claim 3 characterized in that said CAZAC sequence is a polyphase sequence.

5. Learning sequence according to claim 1 characterized in that said reference sequence is a constant amplitude zero auto-correlation sequence near the correlation peak (pseudo-CAZAC sequence).

6. A device for estimating a transmission characteristic of a transmission channel of length L receiving at one end of said channel a training sequence corresponding to a learning sequence produced at the other end of the channel, wherein said learning sequence comprises a guard sequence of length L followed by a reference sequence of length N so that the learning sequence has a total length N+L greater than or equal to 2L+1 and so that a transmission matrix A associated with the learning sequence is such that a resulting matrix, which is the product of the Hermitian transpose $A^H$ of the transmission matrix by the transmission matrix A, is inversible, wherein a part of the training sequence is a receive vector R that corresponds to said reference sequence, and wherein said device comprises estimator means to establish an estimate by calculating the product of the inverse $(A^H A)^{-1}$ of said resulting matrix by the Hermitian transport of said transmission matrix $A^H$ and by said receive vector R.

7. A method of estimating a transmission channel to increase the quantity of data symbols conveyed in a packet of symbols transmitted on the transmission channel, said packet also including a learning sequence of symbols to compensate for intersymbol interference, said method comprising producing a learning sequence of symbols for estimating the transmission characteristic of the transmission channel, said sequence comprising a guard sequence of length L followed by a reference sequence of length N so that the learning sequence has a total length N+L greater than or equal to 2L+1 and so that a transmission matrix A associated with the learning sequence is such that the product of the Hermitian transpose $A^H$ of the transmission matrix by the transmission matrix A is inversible, the length L being defined as the number of symbol periods equivalent to the difference between the longest and shortest transmission paths of the channel, and said learning sequence being part of a packet of symbols, including data symbols, transmitted on said channel.

8. A transmission system comprising:

a transmission channel, transmitter means for transmitting data over said transmission channel, receiver means for receiving data over said transmission channel, equalizer means for correcting intersymbol interference based on an impulse response of said transmission channel, and a channel estimator device;

wherein said channel estimator device estimates said impulse response of said transmission channel by correlating a respective sequence of received symbols with a replica of a learning sequence;

wherein said learning sequence comprises:
 a guard sequence, and
 a reference sequence;

wherein said guard sequence precedes said reference sequence within said learning sequence; and wherein said learning sequence is free of another guard sequence following said reference sequence.

9. The system as set forth in claim 8, wherein said learning sequence is selected so that:

said guard sequence has a length L, said reference sequence has a length N, a total length N+L of said learning sequence is greater than or equal to 2L+1, a transmission matrix A, associated with said learning sequence, has a Hermitian transpose $A^H$, a product of $A^H$ by A is invertible, and L is defined as a number of symbol periods equivalent to a difference between a longest and a shortest transmission path of said transmission channel.

* * * * *